Sept. 19, 1967  C. B. KNUDSON  3,342,500
PACKING CONSTRUCTION
Filed Aug. 13, 1964
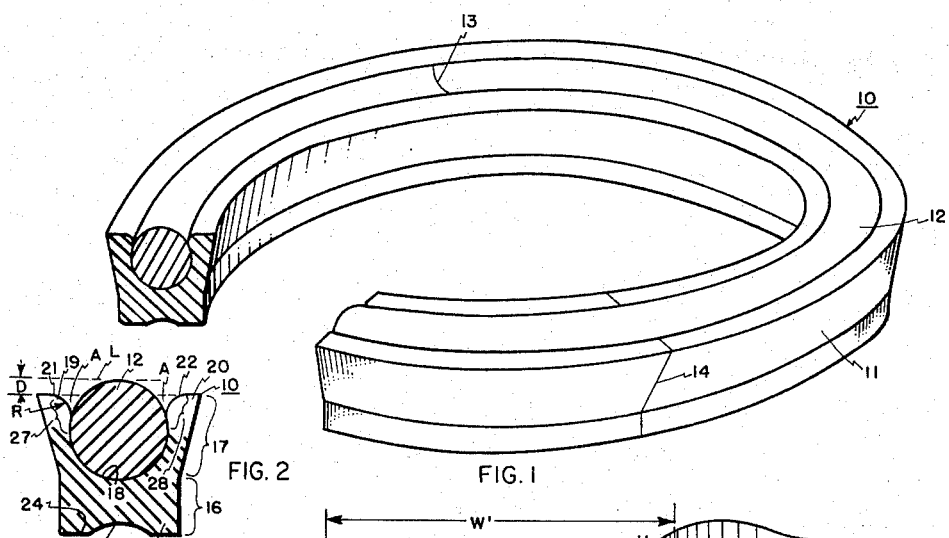
FIG. 1
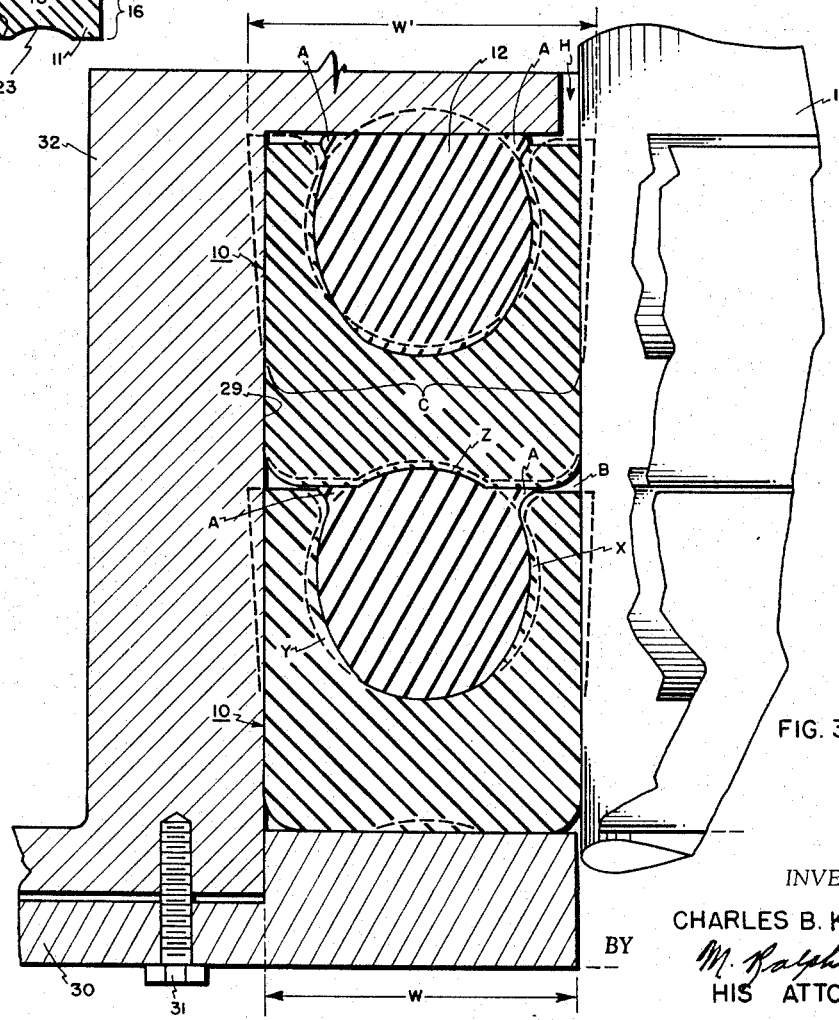
FIG. 2
FIG. 3
INVENTOR.
CHARLES B. KNUDSON
BY M. Ralph Shaffer
HIS ATTORNEY United States Patent Office 3,342,500
Patented Sept. 19, 1967

3,342,500
PACKING CONSTRUCTION
Charles B. Knudson, Salt Lake City, Utah, assignor, by mesne assignments, to Seal Craft Corporation, Salt Lake City, Utah, a corporation of Utah
Filed Aug. 13, 1964, Ser. No. 389,444
2 Claims. (Cl. 277—124)

The present invention relates to machinery packing and, more particularly, the new and improved composite packing ring structure.

The principal object of the present invention is to provide new and useful composite packing ring structure for machinery wherein effective hydrostatic loading of the packing may be accomplished so that stresses, element distortions, and other deleterious features are eliminated in the packing when the same is loaded in the machinery for which it is intended.

A further object is to provide a composite O-ring, packing ring member construction for composite packing wherein suitable relief area is provided the O-ring in such a manner that distortion or cutting into the O-ring by the packing ring member is least likely to take place.

A further object is to provide annular relief areas in the packing ring member of a snap-seated composite packing ring construction wherein suitable relief areas are provided for O-ring expansion when the packing ring is disposed under pressure.

A further object is to provide a composite packing ring construction which is of a self-loading type having suitable means provided for accommodating distortion in the packing ring when the same is installed and loaded into the machinery.

A further object of the invention is to provide a versatile packing ring structure which may be stacked in a manner similar to multiple V-packings, but which is individually so constructed and arranged that an effective seal may be obtained which is substantially uniform throughout the entire cross-section of the composite seal.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a perspective view, partially cut away for convenience of illustration, of a composite packing ring according to the present invention.

FIGURE 2 is an enlarged, transverse section of the composite packing ring of FIGURE 1, showing the important components and relative dimensional information thereof.

FIGURE 3 is an enlarged, fragmentary, partially sectioned view of machinery incorporating plural composite packings or packing rings as are used in the present invention.

In FIGURE 1 the composite packing ring 10 is shown to include packing ring member 11 and O-ring 12 seated therein. Both are made of urethane, rubber, Neoprene, Teflon, or other resilient, noncompressable, deformable elastomer or plastic composition. The packing ring member 11 and O-ring 12 may have respective, mutually displaced, transverse through slots 13 and 14 for enabling the easy placement of the composite packing ring over a reciprocating shaft such as central member 15 in FIGURE 3. Preferably also, the O-ring is snap-seated into the packing ring member 11 so that, once encompassing the said shaft, the composite packing ring 10 forms, in effect, an integral part.

The cross-section of composite packing ring 10 is illustrated in FIGURE 2. Packing ring member 11 is shown to include a base portion 16 and an upper, deformable, bifurcated portion 17 forming a medial, O-ring seat or groove 18. Preferably the O-ring 12 will be of circular cross-section, in correspondence with the circularly arcuate nature of groove 18. The upper, leg portions 19 and 20 of bifurcated portion 17 have their edge surfaces 21 and 22 preferably co-planar and yet disposed beneath the top level L of O-ring 12. Normally the distance D will be of the order of 6 percent of the O-ring diameter. An annular edge groove 23 is disposed in the bottom edge 24 of base portion 16 so as to provide for the seating of an O-ring of a composite packing ring disposed immediately therebelow, as is seen in FIGURE 3.

Of particular importance in this invention is the inclusion of annular relief areas A which are disposed on both sides of the O-ring and formed by the O-ring and extensions of surfaces 21 and 22 and also by the relief boundary surfaces 27 and 28 of the packing ring member 11. These annular relief areas A provide relief to accommodate the expansion of the O-ring in these areas when the composite packing ring is inserted and pressure loaded in suitable machinery construction shown in FIGURE 3.

Now the composite packing rings 10 illustrated in FIGURE 3 are so constructed and arranged that substantially all space in the cavity C of packing installation bore 29 is filled by the plural packing rings. It is to be noted that pressure applied through flange 30 by attachment bolts 31, as threaded into housing 32 of the structure, applies pressure to the composite O-rings 10 to force the uppermost composite packing ring downwardly slightly, and the lowermost one slightly downwardly as well, so that a uniform, "hydrostatic seal," in effect, for the shaft relative to the housing is accomplished. This is explained more fully below.

Now it will be noted that the overall width of the width W' of the upper bifurcated portion 17 in FIGURE 3 exceeds the width W of the cavity C. The leg portions 19 and 20 are deformed inwardly by virtue of insertion of the packing ring into the cavity so that the solid lines of the bore become the outermost boundaries of the composite packing ring. This distortion from the dotted-line configuration (uncompressed) seen in FIGURE 3 to the solid lines shown indicate that not only is the packing ring member 11 distorted width-wise, but also there is a slight "ovaling" of the O-ring, and that the compressive forces applied by virtue of the securement of flange 30 provides a deformation of O-ring 12 such that the same expands outwardly into areas A so as to fill the latter. Now were the relief areas A not provided, i.e. were the leg upper surfaces 21 and 22 to continue directly to the O-ring, then the packing ring member would tend to cut into the O-ring and the latter distort unduly, so as to deter optimum sealing effects. Furthermore, it has been seen through practice that scoring of the O-ring and consequent damage thereto can result.

Now for proper loading of the packing ring it is evident that the O-ring must extend above the upper surface of the packing ring member. When the composite packing ring member is being loaded, then the upper portion of the packing ring is forced downwardly and, since the sides of the packing ring member are urged inwardly from dotted line to solid line configuration of FIGURE 3, it must of course follow that some space must be provided for the expansion of the O-ring. That is facilitated through the inclusion of relief areas A in the design of the composite packing ring 10.

In common practice the O-ring and the packing ring member will be fabricated from urethane, rubber, Neoprene, or other suitable elastomer or plastic. The durometer of the O-ring will be less than that of the packing ring member, with the durometer on the shore A scale of the O-ring being somewhat between 15 and 90 and the packing ring member being between about 65 and 99. This insures minimum distortion of the packing ring and optimum sealing qualities of the O-ring in the hydrostatic sealing effect of the composite packing.

The annular edge groove 23 serves not only to seat the lower most O-ring adjacent thereto but also provides for accommodation of the O-ring so that an effective hydrostatic loading of the composite pack ring structure is realized.

In FIGURE 3 the two composite packing rings 10 shown are installed in the annular area which is preferably defined as a packing installation bore 29 surrounding central member 15 such as a reciprocating shaft or rod. Hydraulic fluid pressure is introduced into the machinery at H in a conventional manner. It is noted that the seal provided by the composite packing ring will accommodate both very light pressures, wherein the lips or legs of the packing ring members come into play, or where large hydraulic pressures and pneumatic pressures are experienced. It is to be noted that there are no gaps, stresses or other distortions present in the seal, save for the possible exception of very small areas B surrounding the junctures of the composite packing rings. Note is to be made that a continuous, hydrostatically effective seal is made throughout the composite packing ring structure, through both composite rings shown. Thus, full advantage is made of urethane, rubber, neoprene, or other elastomer wherein the material, acting in effect as a liquid seal which is distorted but is not compressed. Suitable relief, through construction and arrangement of the O-ring, the packing ring, areas A and durometer of materials, and packing loading ranges enables the O-ring to expand properly to fill what would otherwise be annular voids in the construction. Thus, relief areas A are so designed that these two areas (A) equal the combined areas $X+Y+Z$ between the solid and dotted lines shown, taking into consideration durometer of materials for the O-ring and packing ring member, and loading pressures for the composite packing.

It may be noted that preferably the boundary areas R have a cross-sectional radius, although such is not strictly necessary to accomplish the features of the invention. The essence of the invention is that areas A, of appropriate relative size, exist in order to accommodate the expansion of the O-ring when the packing is loaded within the structure.

To optimize the useful life of the O-ring, it is preferable that the transverse periphery of boundary surfaces 27 and 28 be arcuate and tangential to the O-ring seat and edge surfaces 21 and 22.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A composite packing comprising a deformable substantially noncompressible elongated packing member having in transverse cross-section a base of width W from which extends a bifurcated portion defined by spaced apart legs forming a groove for receiving an O-shaped member, the surfaces of said legs adjacent the edges of said groove being formed to flare outwardly from a tangential intersection with the inner surfaces of said legs, a deformable substantially noncompressible O-shaped member of durometer less than said packing member snap seated in said groove in surface contact with the inner surfaces of said legs and normally holding said bifurcated portion spread to a width greater than W, said O-shaped member having a diameter exceeding the length of said legs whereby a portion of said O-shaped member extends from said groove, the flared edges of said groove defining with the adjacent surface of said O-shaped member, relief areas, whereby when said legs are constrained to an unspread configuration and said O-shaped member is diametrically compressed to a dimension approaching the length of said legs, a portion of said O-shaped member is displaced into said relief areas, said relief areas being substantially equal to the area of the displaced portion of said O-shaped member.

2. A composite packing for sealing annular spaces comprising a deformable substantially noncompressible packing ring having in transverse cross-section a base of width W from which extends a bifurcated portion defined by spaced apart legs forming a groove for receiving an O-ring, the surfaces of said legs adjacent the edges of said grooves being formed to flare outwardly from a tangential intersection with the inner surfaces of said legs, a deformable substantially non-compressible O-ring of durometer less than that of said packing ring snap seated in said groove in surface contact with the inner surfaces of said legs and normally holding said bifurcated portion spread to a width greater than W, said O-ring having a diameter exceeding the length of said legs whereby a portion of said O-ring extends from said groove, the flared edges of said groove defining with the adjacent surface of said O-ring, relief areas, whereby when said legs are constrained to an unspread configuration and said O-ring is diametrically compressed to a dimension approaching the length of said legs, a portion of said O-ring is displaced into said relief areas, said relief areas being substantially equal to the area of the displaced portion of said O-ring.

References Cited

UNITED STATES PATENTS

| | | | |
|---|---|---|---|
| 2,180,795 | 11/1939 | Christensen | 277—177 |
| 2,387,182 | 10/1945 | Procter | 277—205 |
| 2,509,436 | 5/1950 | Isenbarger | 277—205 |
| 2,705,177 | 3/1955 | Waring | 277—205 |
| 3,169,776 | 2/1965 | Felt | 277—125 |

FOREIGN PATENTS 4,709 1/1894 Great Britain.

LAVERNE D. GEIGER, *Primary Examiner.*

D. MASSENBERG, *Assistant Examiner.*